United States Patent [19]
Goman et al.

[11] Patent Number: 5,813,202
[45] Date of Patent: Sep. 29, 1998

[54] IMPACT ABSORBING MOWER DECK MOUNTING MECHANISM

[75] Inventors: Gerald Eugene Goman, Horicon, Wis.; Marlyn Lee Jerke, Cedar Falls, Iowa

[73] Assignee: Deere & Company, Moline, Ill.

[21] Appl. No.: 648,237

[22] Filed: May 13, 1996

[51] Int. Cl.⁶ .................................................. A01D 34/82
[52] U.S. Cl. ........................ 56/15.2; 56/16.7; 56/320.1; 56/DIG. 3; 56/DIG. 10; 267/291
[58] Field of Search .................................. 56/320.1, 14.7, 56/15.2, 16.7, 12.7, DIG. 11, DIG. 10, DIG. 3, 15.5; 267/286, 287, 291; 188/129

[56] References Cited

U.S. PATENT DOCUMENTS

| | | | |
|---|---|---|---|
| 2,615,535 | 10/1952 | Snyder | 188/129 |
| 2,703,156 | 3/1955 | Depallens | 88/129 |
| 2,741,889 | 4/1956 | Elfes | 56/320.1 |
| 4,854,112 | 8/1989 | Holley et al. | 56/6 |
| 4,864,805 | 9/1989 | Hager et al. | 56/11.9 |
| 5,463,853 | 11/1995 | Santoli et al. | 56/6 |
| 5,471,824 | 12/1995 | Neely | 56/DIG. 10 X |
| 5,507,435 | 4/1996 | Benest | 239/1 |
| 5,566,537 | 10/1996 | Kieffer et al. | 56/15.2 |

OTHER PUBLICATIONS

The Toro Company, brochure title unknown, 1 page, date unknown, published in the U.S.A.

The Toro Company, brochure entitled "Toro Groundsmaster 455–D", 3 pages, dated 1994, published in the U.S.A.

*Primary Examiner*—Heather Shackelford

[57] ABSTRACT

A mechanism for absorbing impacts encountered by a mower deck coupled with a vehicle, including an arm operatively coupled with the vehicle, a longitudinally extending first tube member coupled with the arm and defining a generally linear axis which extends rearwardly and inwardly toward the vehicle, a second tube member operatively coupled with the mower deck, the first tube being slideably received within the second tube for allowing the second tube to shift linearly along the axis as the mower deck encounters frontal impact loads, a compression spring positioned within the tubes for biasing the second tube and mower deck forwardly with respect to the first tube, and the second tube member is allowed to pivot with respect to the first tube member for allowing the mower deck to pivot from side to side to follow undulating ground contours.

32 Claims, 2 Drawing Sheets

IMPACT ABSORBING MOWER DECK MOUNTING MECHANISM

FIELD OF THE INVENTION

The present invention relates to mechanisms which couple a mower deck to a vehicle and which act to absorb frontal impacts loads encountered by the mower deck.

BACKGROUND OF THE INVENTION

Conventional wide area mowers have been provided with a mower deck coupled to the front of a vehicle and wing decks coupled to both sides of the vehicle. These mowers cut a relatively wide swath of grass with every pass of the vehicle. Because the wing decks make these vehicles relatively wide, the operators may inadvertently strike objects such as fence posts and trees with the wing decks. Such impacts can cause damage to both the wing deck and the struck object.

It is known to provide mechanisms for absorbing the load imparted to the wing deck by an object that is struck. Conventional impact absorbing mechanisms tend to be relatively complex and include many parts which cause the manufacture and assembly costs to be relatively high. The various pivot mechanisms which allow the wing decks to pivot with respect to the vehicle as the deck rides over ground undulations are typically seperate from the impact absorbing mechanisms, thereby further increasing the part count and cost of the mowers.

Many conventional wide area mowers have rear steerable wheels, and position the wing decks relatively far forwardly near the axis of the vehicle's front wheels. This allows the mowers to reduce or eliminate any uncut circle of grass remaining after execution of a tight turn. The wing decks are typically coupled with the vehicle behind the front drive wheels of the vehicle, and therefore some type of push arm extends forwardly from the midsection of the vehicle's frame to position the wing decks adjacent the vehicle's front wheels. Some conventional impact absorbing mechanisms include a pivot structure having a vertical pivot axis which allows the mower deck to swing rearwardly and outwardly away from the deck when the mower deck strikes an obstruction. This can cause the mower deck to strike other objects as it swings outwardly from the vehicle after impact.

Some conventional impact absorbing mechanisms require the operator to reset the mechanism after each impact. Resetting the mechanism consumes time and undesirably lengthens the interruption to normal mowing operation.

It would therefore be desireable to provide a wing deck impact absorbing mechanism that does not require the operator to reset the mechanisms after each impact. It would also be desirable for such a mechanism to not swing out away from the vehicle when the deck strikes an obstruction. It would be desirable for such a mechanism to be simple in construction such that is includes relatively few parts and is relatively inexpensive to manufacture and assemble.

SUMMARY OF THE INVENTION

The present invention provides a wing deck mounting mechanism which absorbs frontal impacts. A first tube is fixed to a vehicle's push arm. A second tube to which the wing deck is operatively coupled fits over the first tube. A compression spring positioned within the first and second tubes biases the second tube forwardly with respect to the first tube. A threaded rod member and third tube member are also positioned within the first and second tubes for operatively limiting the distance that the spring can shift the second tube with respect to the first tube. As an impact load is encountered by the wing deck, the deck will shift rearwardly, causing the second tube and threaded rod to shift rearwardly therewith. The spring is compressed by this rearward movement. The first tube defines an axis along which the second tube and wing deck shift in response to impact loads. The axis extends linearly toward the vehicle such that the deck will shift inwardly toward the vehicle after impact. This reduces or eliminates the possibility of other objects being struck by the deck as it shifts in response to impact loads. When the deck is clear of the obstruction the spring will extend urging the second tube forwardly with respect to the first tube. The spring therefore returns the second tube and mower deck to their pre-impact positions without requiring the operator to reset the mechanism. The threaded rod and third tube act as a limiting member which limits the distance that the second tube will be shifted forwardly with respect to the first tube by the force of the spring. A head portion of the rod can be turned by an operator to adjust the preload in the compression spring. The second tube is free to pivot about the axis defined by the first tube, and thereby provides a pivot mechanism which allows the wing deck to pivot side to side as it encounters ground undulations. Various parts of the mechanism therefore serve dual functions, which tends to reduce the complexity, part count and cost of the mechanism.

DETAILED DESCRIPTION OF THE PREFERRED EMBODIMENT

Figure 1:
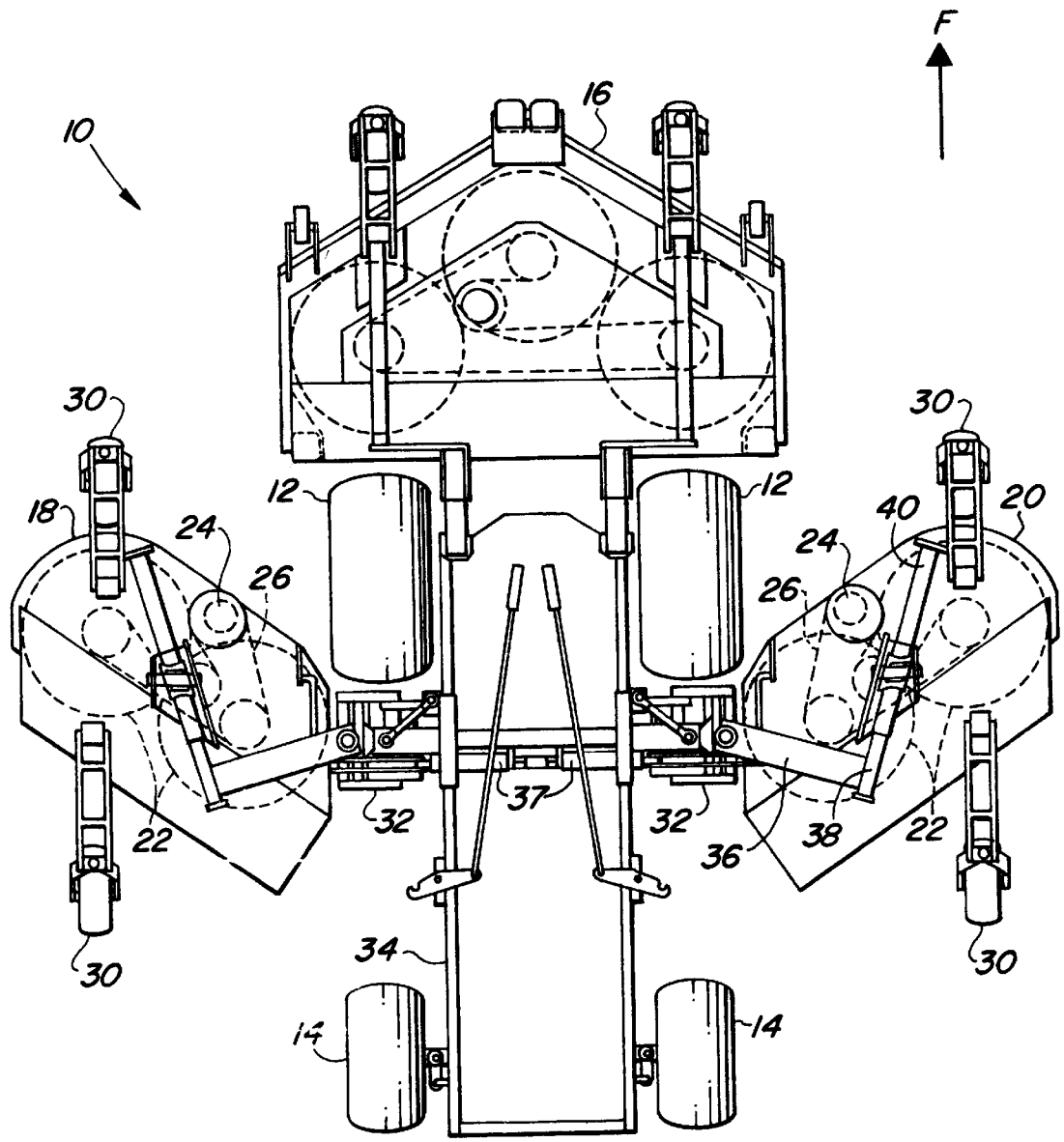
FIG. 1 is a plan view of a wide area mowing vehicle provided with the present invention.
Figure 2:
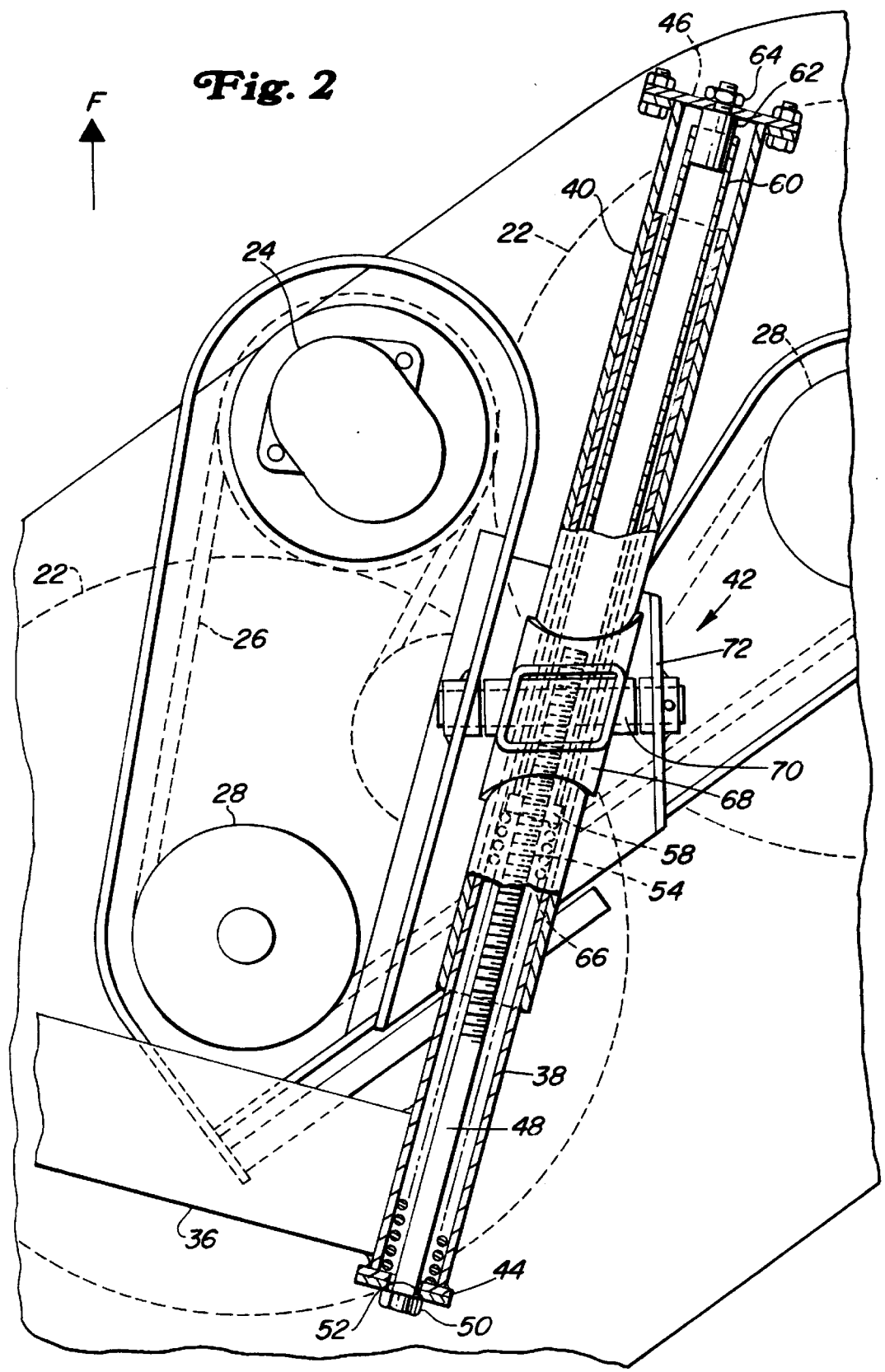
FIG. 2 is a plan sectional view of the impact absorbing mechanism according to the preferred embodiment of the present invention.

Referring now to FIGS. 1 and 2, there is shown the preferred embodiment of the present invention. A vehicle 10 includes front and rear pairs of ground engaging wheels 12 and 14. The front wheels 12 are driven, and the rear wheels 14 are steerable. Rear wheel steering allows the vehicle 10 to execute relatively tight turns. A front mower deck 16 is mounted to be pushed in front of the vehicle 10. A pair of wing decks 18 and 20 are positioned to the sides of the vehicle 10 such that the vehicle 10 mows a relatively wide area of grass. The wing deck 20 on the right side of the vehicle 10 will be discussed in detail herein, but the structure on the left side of the vehicle 10 is generally identical to that on the right. The wing decks 18 and 20 are positioned proximate the axis of the the front wheels 12 so that little or no grass is left uncut when executing a turn. The cutting blades 22 which rotate within the mower decks 18 and 20 are driven by a hydraulic motor 24 and a drive belt 26 that engages blade pulleys 28. A plurality of caster wheels 30 support the wing decks 18 and 20 and allow the decks 18 and 20 to closely follow undulating ground contours.

A lift mechanism 32 is mounted with the vehicle frame 34 and pivotally supports a push arm 36 which extends outwardly from the side of the vehicle 10. During normal mowing operation, the lift mechanism 32 allows the push arm 36 to pivot freely about both lateral and longitudinally extending horizontal axes for allowing the wing deck 20 to closely follow ground contours. Hydraulic cylinders 37 are coupled with the lift system 32 and can be actuated by the operator to raise and lower the wing deck 20 between operating and transport positions. A first member or tube 38 is fixed to the outer end portion of the push arm 36. The first tube 38 is received within a second member or tube 40, as best seen in FIG. 2. The second tube 40 includes a mounting mechanism 42 that operatively mounts the mower deck 20 to the second tube 40. The second tube 40 shifts along the axis of the first tube 38 as frontal impact loads are imparted to the mower deck 20, as will be described in greater detail below.

The present invention includes structure for absorbing frontal impact loads and for retaining the first and second tubes 38 and 40 in operative engagement with one another. First and second end caps 44 and 46 are fixed to the outer end portions of the respective tube members 38 and 40. A threaded rod member 48 having a hex shaped head portion 50 is slideably received within an opening 52 in the first end cap 44. A threaded front end portion 54 of the threaded rod member 48 is received within an opening in an end wall 58 fixed to a third tube member 60. The front end of the third tube 60 is fixed by a threaded member 62 and nut 64 to the second end cap 46 which covers the forward end portion of the second tube 40. A compression spring 66 is positioned within the first tube 38 and presses outwardly against the first end cap 44 and the end wall 58 of the third tube 60.

As can be seen in FIG. 2, the first tube 38 is slideably received within the second tube 40. The third tube 60 is positioned within the first and second tubes 38 and 40. The compression spring 66 is positioned within the first tube 38 and a portion of the second tube 40. The threaded rod member 48 is positioned within the first tube 38 and the compression spring 66.

The mounting mechanism 42 includes a sleeve 68 fixed to the outer surface of the second tube 40. A pivot pin member 70 which extends generally laterally with respect to the vehicle 10 is pivotally supported by the sleeve 68. The pivot pin 70 is fixed to brackets 72 mounted to the deck 20. The pivot pin 70 pivots with respect to the sleeve 68 for allowing the deck 20 to pitch fore and aft to closely follow undulating ground contours.

Next, the operation of the present invention will be described in greater detail. During operation the push arm 36 will act to push the wing deck 20 forwardly with the vehicle 10 to mow grass alongside the vehicle 10. The wing deck 20 may strike obstructions such as curbs, trees and fenceposts during normal operation. The deck 20 will shift rearwardly in response to a large frontal impact load. During an impact, the deck 20 shifts rearwardly, shifting the second tube 40, second end cap 46, third tube 60, end wall 58 and threaded rod 48 rearwardly therewith. The threaded rod 48 slides rearwardly within the opening 52 in the first end cap. Rearward shifting of the end wall 58 acts to compress the compression spring 66 against the first end cap 44. The wing deck 20 shifts linearly along the axis defined by the first tube 38. The first tube 38 and axis extends rearwardly and inwardly toward the vehicle 10, and therefore the wing deck 20 will shift inwardly toward the vehicle 10 along the axis of the first tube 38 when the deck 20 encounters large frontal impact loads. This inward shifting of the wing deck 20 prevents the deck 20 from swinging outwardly where it might strike and damage other objects.

After the deck 20 is clear of the obstruction, the compression spring 66 presses forwardly against the end wall 58, which serves to urge the end wall 58, threaded rod 48, third tube 60, second end cap 46, second tube 40 and wing deck 20 forwardly with respect to the first tube 38. The deck 20 will thereby spring forwardly until the head portion 50 of the threaded rod 48 abuts against the outer surface of the first end cap 44. The wing deck 20 will therefore automatically spring back to its original pre-impact position without requiring the operator to reset the mechanism.

The present invention also allows the deck 20 to pivot or roll from side to side. The second tube member 40 is free to pivot about the first tube 38. As the deck 20 rolls across undulating ground contours the deck 20 pivots from side to side, causing the second tube 40 to pivot about the axis defined by the first tube 38. Therefore, the present invention provides an impact absorbing mechanisms that also serves as a pivot mechanism for the wing deck 20. Various parts serve dual functions, thereby reducing the part count and cost of manufacture and assembly.

The present invention allows the operator to adjust the amount of preload in the spring 66. Turning the hex shaped head portion 50 of the rod member 48 causes the end wall 58 which engages the threads 54 to shift axially along the rod 48. The position of the end wall 58 with respect to the first end cap 44 is thereby adjusted, which will compress or extend the spring 66. This will adjust the amount of compressive force exerted by the spring 66 in the neutral mode. Shortening the distance between the end wall 58 and the first end cap 44 will compress the spring 66 and cause the spring 66 to exert a larger force or preload to the second tube 40. Increasing the distance between the end wall 58 and first end cap 44 will extend the spring 66 and cause the spring 66 to exert a smaller force or preload to the second tube 40. The spring 66 shoud be adjusted so that the preload is large enough that the second tube 40 is held firmly in place in its fully extended position, but the the spring 66 should not apply so large a preload that the deck 20 will not shift rearwardly during a frontal impact. It is preferred that the spring 66 apply a preload of approximately one hundred pounds.

The spring 66 according to the preferred embodiment is enclosed within the first and second tube members 38 and 40. The tubes 38 and 40 shelter the spring 66 fron the environment, and thereby generally prevent objects from being caught in the spring 66 during operation. The life of the spring 66 is thereby enhanced, and the objects in the environment are prevented from being damaged by the spring 66.

I claim:

1. In combination, a mechanism which absorbs impacts encountered by a mower deck and coupled with a vehicle, comprising:

an arm operatively coupled with the vehicle, a first member coupled with the arm and defining a generally linear axis, the first member and generally linear axis extend generally longitudinally with respect to forward direction of vehicle travel, a second member operatively coupled with the mower deck and coupled with the first member for shifting the second member and mower deck linearly along said axis as the mower deck encounters frontal impact loads, and a biaser operatively coupled between the first and second members for biasing the mower deck forwardly and for returning the second member and mower deck to their respective pre-impact positions.

2. The invention of claim 1, wherein said first member and generally linear axis extend rearwardly and inwardly toward the vehicle such that the mower deck will shift linearly inwardly toward the vehicle as the mower deck encounters frontal impact loads.

3. The invention of claim 1, wherein said second member is pivotal with respect to the first member about the axis to allow the mower deck to pivot from side to side to closely follow undulating ground contours.

4. The invention of claim 1, wherein:

said first and second members further comprise respective first and second elongate tube members operatively coupled with each other such that the second tube member and mower deck shift linearly along the axis defined by the first tube member as the mower deck encounters impacts.

5. The invention of claim 4, wherein:

the second tube member includes a hollow inner portion, the first tube member is generally elongate and positioned within the hollow inner portion of the second tube member for allowing the second tube member to shift along the axis defined by the first tube member as the mower deck encounters frontal impact loads.

6. The invention of claim 5, wherein said biaser is a compression spring positioned within the tube members in operative abutment with the first and second tube members for biasing the second tube member forwardly.

7. The invention of claim 1, and further comprising a limiting member which limits the extent to which the biaser can shift the mower deck forwardly.

8. The invention of claim 5, and further comprising a limiting member which limits the extent to which the biaser can shift the mower deck forwardly, said limiting member further comprising a rod member operatively fixed to and extending within the first and second tube members.

9. The invention of claim 8, wherein said rod member includes a head and threaded portion, said rod member being adjustable for altering a preload force applied by the biaser, wherein said biaser is a spring.

10. The invention of claim 8, wherein said limiting member also includes a third tube member operatively coupled with the rod member, said rod member and third tube member being positioned within the first and second tube members.

11. The invention of claim 8, wherein said second tube member is pivotable about the axis defined by the first tube member for allowing the mower deck to pivot from side to side to closely follow undulating ground contours.

12. The invention of claim 4, wherein said second tube member is pivotable about the axis defined by the first tube member for allowing the mower deck to pivot from side to side to closely follow undulating ground contours.

13. The invention of claim 4, wherein:

said biaser further comprises a compression spring positioned within the first and second tube members, and first and second end cap members coupled with the respective first and second tube members and against which the compression spring operatively abuts.

14. In combination, a mechanism which absorbs impacts encountered by a mower deck and coupled with a vehicle, comprising:

an arm operatively coupled with the vehicle, a longitudinally extending first tube member coupled with the arm and defining a generally linear axis, a second tube member operatively coupled with the mower deck, the first tube member being slideably received within the second tube member for allowing the second tube member to shift linearly along the axis as the mower deck encounters frontal impact loads, a compression spring positioned within at least one of the tube members and operatively coupled between the first and second tube members for biasing the second tube member and mower deck forwardly with respect to the first tube member.

15. The invention of claim 14, wherein:

the second tube member is allowed to pivot with respect to the first tube member and about the axis for allowing the mower deck to pivot from side to side to follow undulating ground contours.

16. The invention of claim 15, wherein:

the axis extends rearwardly and inwardly toward the vehicle such that the mower deck will shift linearly inwardly toward the vehicle as the mower deck encounters frontal impact loads.

17. The invention of claim 16, and further comprising a limiting member which limits the extend to which the spring can shift the second tube member forwardly with respect to the first tube member.

18. The invention of claim 17, wherein the limiting member further comprises a rod member operatively fixed to and extending within the first and second tube members.

19. The invention of claim 18, wherein said limiting member also includes a third tube member operatively coupled with the rod member, said rod member and third tube member being positioned within the first and second tube members.

20. The invention of claim 18, wherein said rod member further comprises a head portion and threaded portion, said rod member being adjustable for altering the preload force applied by the spring.

21. The invention of claim 20, wherein the rod member is turnable for adjusting the relative positions of the first and second tube members for compressing and extending the spring to alter the preload force applied by the spring.

22. The invention of claim 15, and further comprising a limiting member which limits the extend to which the spring can shift the second tube member forwardly with respect to the first tube member.

23. The invention of claim 22, wherein the limiting member further comprises a rod member operatively fixed to and extending within the first and second tube members.

24. The invention of claim 23, wherein said rod member further comprises a head portion and threaded portion, said rod member being adjustable for altering the preload force applied by the spring.

25. The invention of claim 24, wherein the rod member is turnable for adjusting the relative positions of the first and second tube members for compressing and extending the spring to alter the preload force applied by the spring.

26. In combination, a mechanism which absorbs impacts encountered by a mower deck and coupled with a vehicle, comprising:

an arm operatively coupled with the vehicle, a longitudinally extending first member coupled with the arm and defining a generally linear axis, a second member operatively coupled with the mower deck and coupled with the first member for shifting linearly along said axis as the mower deck encounters frontal impact loads, a biaser operatively coupled between the first and second members for biasing the mower deck forwardly and for returning the second member and mower deck to their respective pre-impact positions, said first and second members further comprise respective first and second elongate tube members operatively coupled with each other such that the second tube member shifts linearly along the axis defined by the first tube member as the mower deck encounters impacts, the first tube member is generally elongate and positioned within the second tube member for allowing the second tube member to shift along the axis defined by the first tube member as the mower deck encounters impact loads, and said biaser is a compression spring positioned within the tube members in operative abutment with the first and second tube members for biasing the second tube member forwardly.

27. In combination, a mechanism which absorbs impacts encountered by a mower deck and coupled with a vehicle, comprising:

an arm operatively coupled with the vehicle, a longitudinally extending first member coupled with the arm and defining a generally linear axis, a second member operatively coupled with the mower deck and coupled with the first member for shifting linearly along said axis as the mower deck encounters frontal impact loads, a biaser operatively coupled between the first and second members for biasing the mower deck forwardly and for returning the second member and mower deck to their respective pre-impact positions, said first and second members further comprise respective first and second elongate tube members operatively coupled with each other such that the second tube member shifts linearly along the axis defined by the first tube member as the mower deck encounters impacts, the first tube member is generally elongate and positioned within the second tube member for allowing the second tube member to shift along the axis defined by the first tube member as the mower deck encounters impact loads, and a limiting member which limits the extent to which the biaser can shift the mower deck forwardly, said limiting member further comprising a rod member operatively fixed to and extending within the first and second tube members.

28. The invention of claim 27, wherein said rod member includes a head and threaded portion, said rod member being adjustable for altering a preload force applied by the biaser, wherein said biaser is a spring.

29. The invention of claim 27, wherein said limiting member also includes a third tube member operatively coupled with the rod member, said rod member and third tube member being positioned within the first and second tube members.

30. The invention of claim 27, wherein said second tube member is pivotable about the axis defined by the first tube member for allowing the mower deck to pivot from side to side to closely follow undulating ground contours.

31. In combination, a mechanism which absorbs impacts encountered by a mower deck and coupled with a vehicle, comprising:

an arm operatively coupled with the vehicle, a longitudinally extending first member coupled with the arm and defining a generally linear axis, a second member operatively coupled with the mower deck and coupled with the first member for shifting linearly along said axis as the mower deck encounters frontal impact loads, a biaser operatively coupled between the first and second members for biasing the mower deck forwardly and for returning the second member and mower deck to their respective pre-impact positions, said first and second members further comprise respective first and second elongate tube members operatively coupled with each other such that the second tube member shifts linearly along the axis defined by the first tube member as the mower deck encounters impacts, wherein said biaser further comprises a compression spring positioned within the first and second tube members, and first and second end cap members coupled with the respective first and second tube members and against which the compression spring operatively abuts.

32. The invention of claim 2, wherein said second member is pivotal with respect to the first member about the axis to allow the mower deck to pivot from side to side to closely follow undulating ground contours.

* * * * *